UNITED STATES PATENT OFFICE.

RUSSELL A. SMITH, OF TITUSVILLE, PENNSYLVANIA, ASSIGNOR OF ONE-FOURTH TO JOHN L. EMERSON AND ONE-FOURTH TO E. O. EMERSON, JR., OF TITUSVILLE, PENNSYLVANIA.

PROCESS OF CLEANING MOLDING-SAND.

962,265.     Specification of Letters Patent.     Patented June 21, 1910.

No Drawing.     Application filed August 8, 1906. Serial No. 329,775.

*To all whom it may concern:*

Be it known that I, RUSSELL A. SMITH, a citizen of the United States, residing at Titusville, in the county of Crawford and State of Pennsylvania, have invented certain new and useful Improvements in Processes of Cleaning Molding-Sand, of which the following is a specification.

My invention relates to improvements in processes for cleaning molding sand, and the leading object of my invention is the provision of a simple and efficient method by which sand which has been used for core making or molding may be cleaned and used over again.

A further object of the invention is to preserve all the useful by-products which are evolved or formed during the cleaning process.

With these and other objects of a similar character as hereinafter disclosed in view, my invention consists, in brief, of a cleaning process substantially as follows: subjecting a mixture of sodium sulfate, calcium carbonate and used molding sand, to heat, washing with water by percolation, allowing the sodium carbonate to crystallize, and subjecting the mixture to repeated washings.

The materials used in the process are calcium carbonate, (or dead lime, or chalk or lime stone) and sodium sulfate. The by-product of the process is sodium carbonate, or the process may be easily diverted so as to form sodium hydrate, sodium bicarbonate, or in fact almost any of the sodium products.

The materials forming the mixture are combined in the following proportions:

Dried sodium sulfate_____1 part
    Calcium carbonate__1 to 1¼ parts
    Black or used sand_10 to 20 parts according to the degree of cleanliness desired.

The foregoing materials are thoroughly mixed and heated to aid them in combining. The mixture is then allowed to cool and after cooling is washed by percolation with about one half its weight of water, and the water is run into a tank and allowed to stand until clear. The clear water is then decanted and evaporated until the remaining portion has a specific gravity of 1.13. The mixture is then allowed to stand until the sodium carbonate in the solution has crystallized upon horizontal iron or wooden bars which have been previously placed in the mixture for that purpose. The sodium carbonate is thus disposed of. The sand, calcium hydrate, calcium sulfid and free carbon remaining, the carbon having been mixed with the sand which it had served as a facing for in the mold, are mixed with water and stirred slightly, allowing the water and washings to stand until the sediment has been precipitated. This sediment is sand, calcium sulfid and calcium hydrate, the small percentage of free carbon which has not united with the sodium being lighter, remains suspended and is allowed to float over into another tank. This last mixture of free carbon and water may be allowed to stand until the carbon settles. The water is then decanted and the sediment dried and again used as molder's facing, *i. e.* as a dusting powder to be used on the surface of sand molds to give smoothness to the iron cast therein. When the carbon was washed from the calcium sulfid and calcium hydrate these compounds were left quite clean but still mixed with the sand. I now remove them from the sand by a purely mechanical method, no chemical change taking place. This washing is conducted in much the same manner as is customary in the washing of gold from sand from river beds and does not depend on the solubility of any of the substances. The calcium sulfid and calcium hydrate are lighter than the sand, and when mixed with running water are easily made to flow away, the sand being slightly stirred at the time.

In order that this may be readily understood and the ease and simplicity of the operation fully comprehended I describe the following simple experiment illustrative thereof. In a tumbler or like article place a small quantity of coarse sand, and mix therewith either calcium sulfid or calcium hydrate, or both. Then hold the mixture under a faucet and let a stream of water fall two or three inches into the tumbler, allowing the water to overflow and at the same time stirring the mixture. It will be found that the calcium compounds will all rise to the top and float away, thus leaving the sand entirely free. After a washing process of this character the sand is entirely clean and free from all other substances except water and only needs to be drained to be ready to use again for the same purpose as the new sand is used. Superheated steam is introduced into the tank containing the calcium sulfid and calcium hydrate, enough of said steam being introduced to raise the temperature of the mixture to approximately boiling point, the substances being changed by the action of the steam and water heated thereby into calcium hydrate and hydrogen sulfid, after which the mixture is again allowed to settle and the water is decanted into another tank. This operation may be repeated several times, the decanted water being saved each time. The solid matter which will remain in the tank will be found to be calcium hydrate, the calcium sulfid originally present having been decomposed by the action of the steam into calcium hydrate and hydrogen sulfid, which latter being a soluble gas remains in the water while the former being practically insoluble is precipitated to the bottom of the tank, where it lies as a sediment. The tank having been emptied of the water containing the hydrogen sulfid, the sediment is washed with cold water, which water is drained off and the mixture exposed to the air for drying. To retard the drying of the calcium hydrate it is occasionally sprinkled with cold water, until when at length it is permitted to thoroughly dry the calcium hydrate has become carbonated and is changed back again into calcium carbonate which may be reused in the initial step of this process or in any other desired manner. The hot water in which the hydrogen sulfid was held in solution may be saved and used in the manufacture of sodium hyposulfite or other sulfites or sulfids.

If desired, instead of allowing the mixture of sodium carbonate and water to crystallize it may be diverted to sodium hydrate by raising and maintaining the temperature at boiling point for a half an hour or so and while at this temperature adding at intervals small quantities of calcium oxid. This last step while increasing the value of the by-product decreases the weight. As soon as the calcium oxid comes in contact with the water it becomes hydrated, forming calcium hydrate, the calcium hydrate then entering into composition with the sodium carbonate to form calcium carbonate and sodium hydrate.

Sodium bicarbonate may be formed by forcing air or carbon dioxid gas through a 20% solution of sodium carbonate and water and evaporating and crystallizing the mixture, avoiding a temperature above 100 degrees F.

From the foregoing description the results produced by the use of and the advantages of my process for cleaning molding sand will be readily understood and its general operation be fully understood.

To make more clear the various combinations entered into by the elements in the original mixture and the changes which they undergo, I annex hereto a statement of the various chemical reactions which take place. The sodium sulfate ($Na_2SO_4$) is first deoxidized by the carbon (C) in the black sand, forming sodium sulfid ($Na_2S$) and carbon dioxid ($CO_2$), $$Na_2SO_4 + 2C = Na_2S + 2CO_2.$$

The sodium sulfid ($Na_2S$) thus formed then enters into double decomposition with the calcium carbonate ($CaCO_3$) taken and forms calcium sulfid (CaS) and sodium carbonate ($Na_2CO_3$), $$Na_2S + CaCO_3 = Na_2CO_3 + CaS.$$

In addition to these changes, under the action of the heat a portion of the excess of calcium carbonate ($NaCO_3$) is decomposed into calcium oxid (CaO) and carbon dioxid ($CO_2$), $$Na_2CO_3 = Na_2O + CO_2;$$

while the carbon dioxid ($CO_2$) unites with any excess of carbon present to form carbon monoxid, $$CO_2 + C = 2CO,$$

it being understood that ordinarily a much larger amount of carbon is present than is affected or absorbed by this reaction. The sum of the reactions may be expressed thus:

$$2Na_2SO_4 + 3CaCO_3 + 9C = 2Na_2CO_3 + CaO + 2CaS + 10CO.$$

From this formula it will be seen that the final results are sodium carbonate ($Na_2CO_3$), calcium sulfid (CaS) and calcium oxid (CaO). After dissolving the sodium carbonate ($Na_2CO_3$) with cold water by percolation, the mixture still contains in addition to water only sand, calcium oxid (CaO), which by the action of water ($H_2O$) is changed to calcium hydrate ($Ca(OH)_2(OH)$).

$$CaO + H_2O = Ca(HO)_2;$$

and the calcium sulfid (CaS) which are practically insoluble in cold water. These products are then removed from the sand by purely mechanical methods, no further chemical change taking place. The calcium sulfid (CaS) and calcium hydrate ($Ca(HO)_2$) are then changed to hydrogen sulfid ($H_2S$) and calcium hydrate ($Ca(OH)_2$) by the action of the superheated steam and hot water; the chemical change in this case being as follows:

$$CaS + H_2O = CaO + H_2S,$$

while the hydrogen sulfid ($H_2S$) being a soluble gas remains in the water and the calcium oxid (CaO) unites with the water (H₂O) to form calcium hydrate (Ca(HO)₂);

$$CaO + H_2O = Ca(HO)_2.$$

The calcium hydrate then falls as a sediment and after it has settled the water is decanted leaving only the calcium hydrate. The calcium hydrate is then washed with cold water, being changed by exposure to the actions of the air and water which contain carbon dioxid (CO₂) to calcium carbonate (CaCO₃):

$$Ca(OH)_2 + CO_2 = CaCO_3 + H_2O.$$

From the foregoing description and formulæ the various steps of my process will be readily understood and its advantages fully appreciated, and it is evident that I have provided a practical method of cleaning molding sand and freeing it from the carbon impurities and also preserving all the by-products of the process.

I claim:

1. The process of cleaning molding sand containing a certain amount of carbon, consisting in heating a mixture of said sand, and of lime and sulfate of soda, allowing water to percolate through the sand and extracting the sal soda from the water, again washing the sand and saving the washings of sulfate of lime and free carbon, washing the lime with hot water to carry off the sulfate from the lime, and finally allowing the lime to dry slowly while exposed to the air and occasionally treated with cold water.

2. The process of cleaning molding sand, consisting in heating the sand, mixed with sodium sulfate and lime, allowing water to percolate through the sand, extracting the sodium carbonate from the water again washing, and finally recovering the lime.

3. The process herein described, consisting in heating a mixture of sand which contains a percentage of carbon, carbonate of lime, and sodium sulfate, allowing water to percolate through the mixture, extracting the sal soda from the water, washing the sand to free it of carbon, and finally subjecting the remaining sand to repeated washings.

4. The method of heating sand, sodium sulfate and carbonate of lime, washing the mixture a number of times, and recovering the by-products of each washing.

5. The process of cleaning molding sand, consisting in heating sand in combination with lime and sodium sulfate, washing the mixture repeatedly, and recovering the by-products at different steps in the treatment of the sand.

In testimony whereof I have signed my name to this specification in the presence of two subscribing witnesses.

RUSSELL A. SMITH.

Witnesses:
E. J. VINOPAL,
FRANK B. SMITH.